United States Patent
Smith

[15] 3,690,392
[45] Sept. 12, 1972

[54] CONTINUOUS FLOW SCALE WITH PRELIMINARY VOLUMETRIC MEASUREMENT

[72] Inventor: James M. Smith, Golden, Colo.

[73] Assignee: The Great Western Sugar Company, Denver, Colo.

[22] Filed: Feb. 24, 1970

[21] Appl. No.: 14,264

[52] U.S. Cl. .................... 177/59, 177/111, 177/114, 141/83, 141/196, 222/52
[51] Int. Cl. .............................................. G01g 13/16
[58] Field of Search.......... 177/59, 62, 111, 114, 122, 177/123; 222/20, 55, 52, 58, 444, 450, 77; 141/83, 196; 73/256

[56] References Cited

UNITED STATES PATENTS

| 3,209,844 | 10/1965 | Stambera et al. ....... 177/123 X |
| 3,404,742 | 10/1968 | Bonneric ................. 222/77 X |
| 3,566,613 | 3/1971 | Kinney ..................... 222/77 X |
| 3,103,252 | 9/1963 | Mueller .................. 177/114 X |
| 3,539,028 | 11/1970 | Krolopp................. 177/114 X |
| 3,404,742 | 10/1968 | Bonneric ................... 177/59 |
| 2,755,007 | 7/1956 | Knobel .................... 141/83 X |
| 2,324,667 | 7/1943 | Baker et al. ............. 177/114 |

FOREIGN PATENTS OR APPLICATIONS

| 876,754 | 9/1961 | Great Britain............... 141/83 |
| 910,824 | 11/1962 | Great Britain............... 141/83 |
| 939,830 | 10/1963 | Great Britain............... 141/83 |
| 142,491 | 7/1951 | Australia .................... 141/83 |

Primary Examiner—Richard B. Wilkinson
Assistant Examiner—George H. Miller, Jr.
Attorney—Anderson, Spangler and Wymore

[57] ABSTRACT

Weighing feeder type apparatus which comprises two containers from one of which material is discharged while the other is charged and automatic control means responsive to the charging of a predetermined volume of material to cause the charging action to be shifted from it to the now empty container and to discharge the filled one.

4 Claims, 6 Drawing Figures

INVENTOR
JAMES M. SMITH
BY
Anderson, Spangler & Wymore
ATTORNEY

CONTINUOUS FLOW SCALE WITH PRELIMINARY VOLUMETRIC MEASUREMENT

The present invention is directed to a flow scale and more particularly to a continuous flow scale to receive, weigh and discharge bulk materials on a continuous flow basis.

The primary object of the present invention is to provide an improved continuous flow scale which produces rapid, accurate results under the most extreme, rugged environmental conditions without special care.

A further object of the present invention is to provide an improved flow scale which permits weighing bulk materials in a conveyor or other material flow system without interruption of the flow of material.

A still further important object of the present invention is to provide an improved flow scale which can handle a wide range of flow rates of material to be weighed without any adjustments or changes in its operation.

In accordance with the present invention, the continuous flow scale comprises a plurality of containers for receiving the material to be weighed with means adapted to divert the material to another container when a predetermined volume of material is received in the container. The transfer of feed to a different container also serves to activate a weighing operation to register the weight of the measured volume of material. After weighing the material is discharged onto a moving belt or other disposal means. When the other container receives a predetermined volume, the cycle is repeated with the incoming feed being transferred to an empty container and the now full container being weighed. As each container is weighed this weight is added to the total on an accumulator which can be reset with a key and the like.

For a better understanding of the present invention, together with other and further objects thereof, reference is had to the following description taken in connection with the accompanying drawings and its scope will be pointed out in the appended claims.

Figure 1:
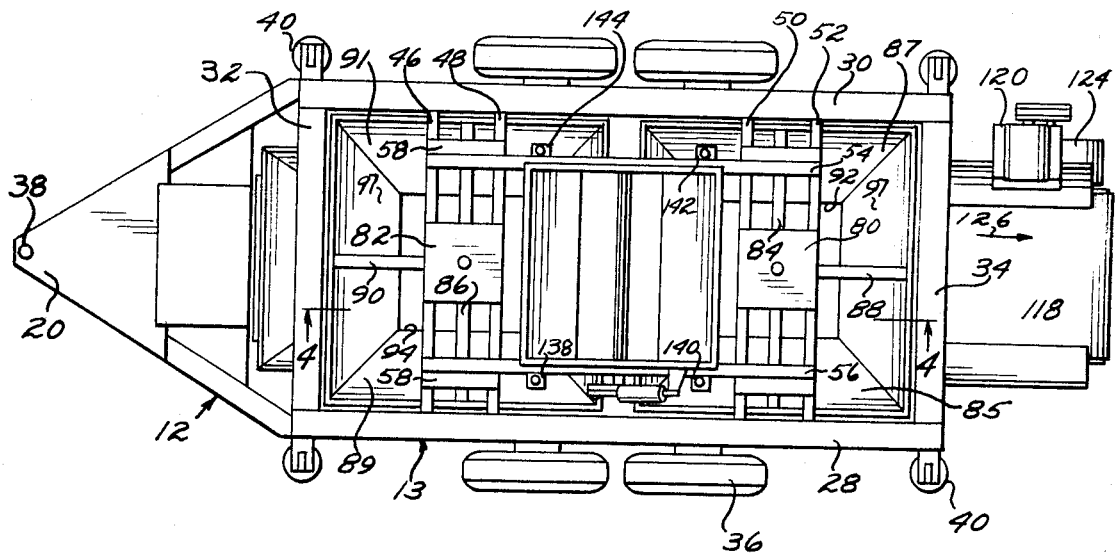
FIG. 1 is a plan view of the overall flow scale.

Referring to the drawings, the flow scale 10 is supported upon a base 12 made up of a pair of parallel spaced I-beam side rails 14 and 16 and a rear end rail 18. The base is provided with a front end rail, not shown, fastened between the side rails at the points where the side rails begin to converge to meet at an apex 20 forward of the front end rail. Base 12 may have a further cross rail, not shown, intermediate the front and rear end rails. Base 12 has a frame 13 formed thereon comprising uprights 22, 24 and 26 supported on beam 14 and corresponding uprights 22a, 24a and 26a supported on beam 16 aligned with the front, rear end rails and the intermediate cross rail. Top side rails 28 and 30 are fastened to the upper ends of uprights 22, 24, 26 and 22a, 24a and 26a. A front upper end rail 32 is fastened between the forward ends of upper side rails 28 and 30 and a rear upper end rail 34 is fastened between the rear ends of upper side rails 28 and 30. Base 12 is provided with a set of tandem wheels 36 and the like to provide mobility. A tongue jack 38 is provided at apex 20 to support the base when not connected to a towing vehicle. A plurality of outrigger jacks 40 may be connected to the ends of cross members 42 positioned at each end of base 12 to extend crosswise thereof underneath the end rails and beyond side rails 14 and 16. Jacks 40 are provided with means for elevating and leveling cross members 42 to level and support base 12 on a supporting surface 44, such as the earth.

Intermediate the upper end rails 32 and 34 a plurality of cross members 46, 48, 50 and 52 are fastened at their ends to top side rails 28 and 30. A pair of stringers 54 and 56 parallel to and spaced inwardly from rails 28 and 30 are each supported at each end by a U-channel 58 parallel to the side rails and spanning cross members 46 and 48, and 50 and 52 being fastened thereto in a suitable manner.

Hopper 59 is supported on either side by stringers 54 and 56. Hopper 59 is provided with a pair of divergent discharge chutes 60 and 62 positioned to discharge material either into a weighing bin 64 or 66 positioned beneath the chutes. Hopper 59 is provided with a flopper valve 68 positioned to selectively close off either discharge chute 60 or 62. Valve 68 is connected to a shaft 70 to which in turn is connected a crank arm 72 attached to an hydraulic actuator 74 for rotating shaft 70 and valve 68 to selectively close one discharge chute and open the other.

The weighing bins 64 and 66 are supported respectively from cross members 50, 52 and 46, 48 by means of load cell rods 76 and 78 connected at the upper ends to support plates 80 and 82 supported respectively on cross members 50, 52 and 46, 48. The lower ends of load cell rods are connected respectively to cross members 84 and 86, the ends of which are attached to opposed sides 85, 87 and 89, 91 of the bins adjacent the upper margin. The load cell rods 76 and 78 are provided with a load cell 182 and 184 positioned intermediate the ends thereof taking the full weight of each bin. A half cross member 88 and 90 is connected between the upper margin of an end 63 and 67 of bins 64 and 66 intermediate the opposed sides 85, 87 and 89, 91 and cross bars 84 and 86 to provide rigidity to the structure. The lower portion of opposed sides 85, 87 and 89, 91 are sloped inwardly and downwardly to define a narrowed bottom opening 92 and 94. A pair of clam jaw closure members 96 and 98 are pivotally connected to ends 63 and 65 of bin 64 to open and close bottom opening 92. A pair of gear wheels 100 and 102 having intermeshed teeth are attached to members 96 and 98 so that pivotal movement of one is transmitted to the other but in the opposite direction. Member 96 is provided with a crank 104 to which is attached the movable actuator rod 106 of actuator 108 which may be of the hydraulic type. The actuator is secured to end 63 of bin 64 such that when rod 106 is moved, closure member 96 moves along with member 98 but in the opposite direction to selectively open or close bottom opening 92. In a similar manner, a pair of clam jaw closure members 108 and 110 are pivotally connected to ends 67 and 69 of bin 66 to open and close bottom opening 94 thereof. A pair of gear wheels having intermeshed teeth are attached to members 108 and 110 so that pivotal movement of one is transmitted to the other but in the opposite direction. The movable rod of an actuator is fastened to member 108 and the actuator is fastened to end 69 of bin 66 such that when actuator arm moves, closure member 108 moves along with member 110 but in the opposite direction to selectively open or close bottom opening 94.

Figure 2:
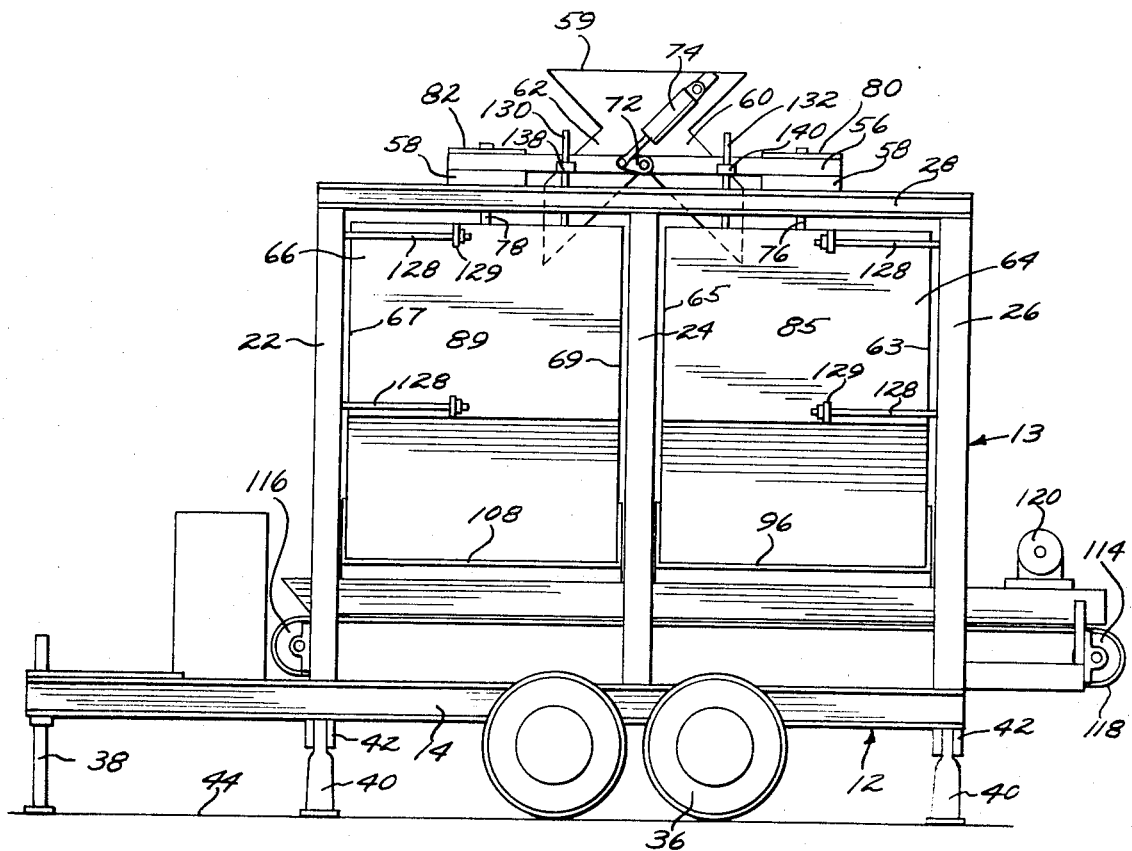
FIG. 2 is a view thereof in elevation.
Figure 3:
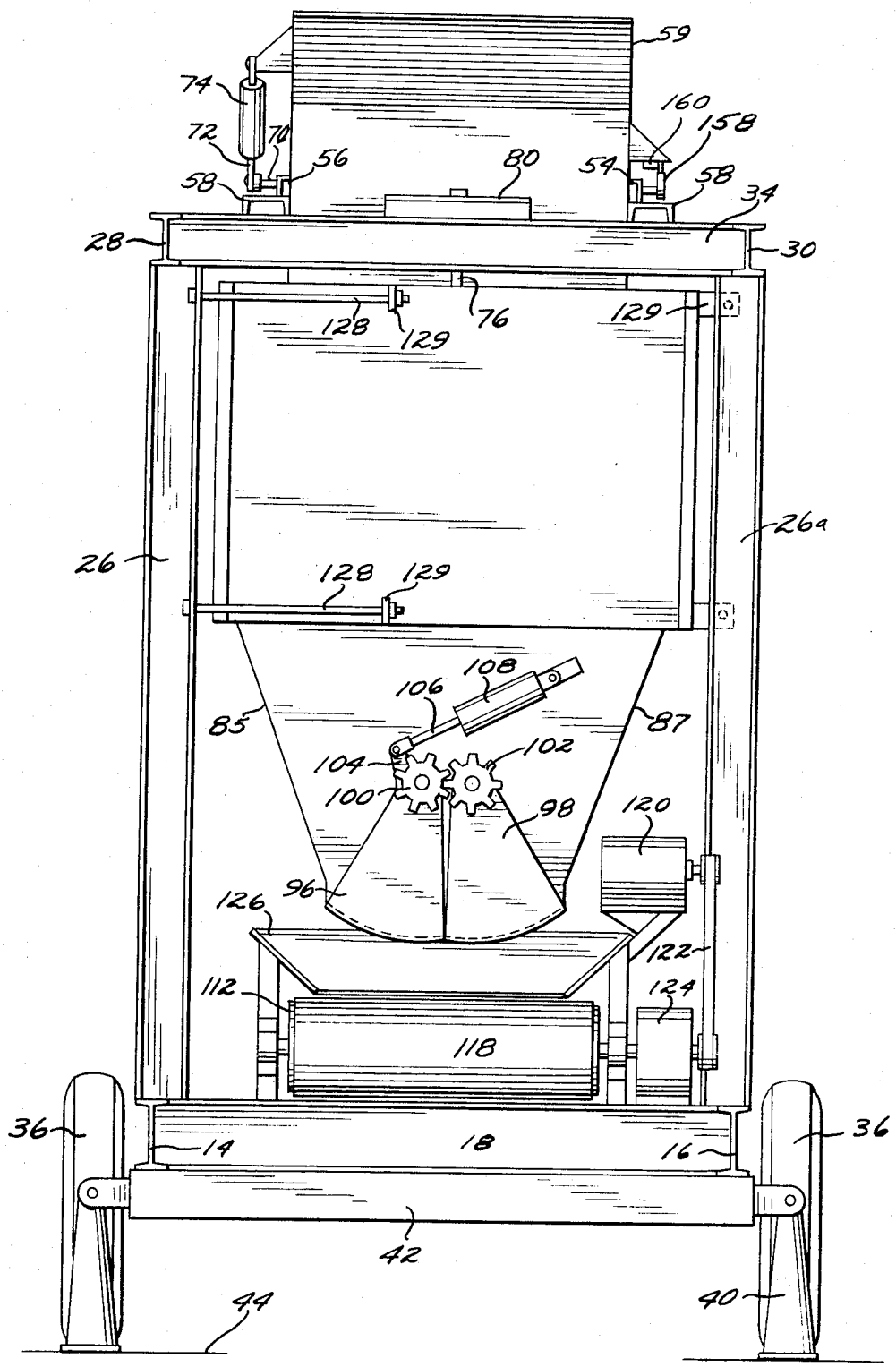
FIG. 3 is an end view of the right hand end of FIG. 2 to an enlarged scale.

Positioned below openings 92 and 94 and supported on base 12 is a belt conveyor 112 comprising a driven pulley 114 at one end and an idle pulley 116 at the other supporting an endless conveyor belt 118 therebetween. Pulley 114 is connected to a motor 120 via belt 122 and speed reducer 124. A deflector 126 having inwardly inclined sides is supported above the belt 118 to direct material discharged from openings 92 and 94 onto the belt. Belt 118 is driven in the direction of arrow 126 to discharge material from the right hand end of the flow scale as depicted in FIGS. 1 and 2.

Since bins 64 and 66 are each suspended from load cells 182 and 184 and in turn are suspended from support plates 80 and 82, a plurality of stabilizer rods 128 are connected to the frame 13 and the sides of the bins 64 and 66 by means of angle brackets 129. The rods 128 are connected to the frame at diametrically opposed corners of the bins and serve to prevent the bins from twisting about a vertical axis.

Feeler rods 130, 132, 134 and 136 are mounted for adjustable vertical positioning in brackets 138, 140, 142 and 144. Brackets 138 and 140 are mounted on stringer 56 and brackets 142 and 144 are mounted on stringer 54. Feeler rods 130 and 136 are positioned above bin 66 to extend thereinto and rods 132 and 134 are positioned above bin 64 also extending down into the interior thereof. Rods 130, 132, 134 and 136 each have a finger 146, 148, 150 and 152 hingedly connected to the lower end thereof and the fingers 146, 148, 150 and 152 carry an adjustable position sensitive electrical switch means 154 and fingers 148, 150, a switch 156, such as a mercury switch, for the purpose to be explained later. On the end of shaft 70 to which is attached flapper valve within chute 59 is attached a cam which on rotation of the flapper from one position serves to actuate a switch 160.

Figure 5:
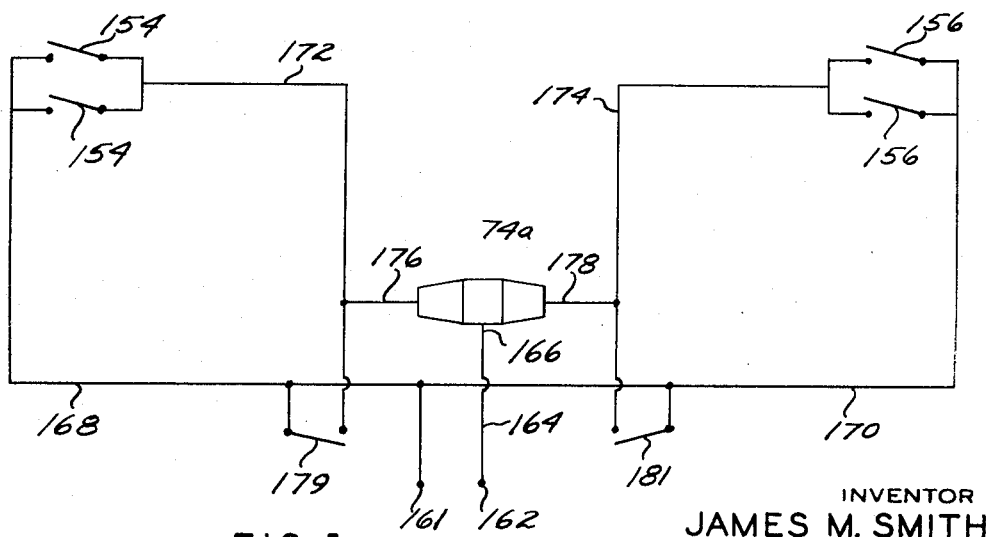
FIG. 5 is an electrical and hydraulic circuit diagram of the feed material transfer and diversion means; and, FIG. 6 is an electrical and hydraulic circuit diagram of the weighing and discharging system of the invention.

Referring now to FIG. 5, the electrical actuating circuit is shown for actuating hydraulic valve 74a which is adapted to supply hydraulic fluid under pressure to actuator 74 to position flapper valve 68 to either close chute 60 or 62. The terminals 161 and 162 are connected to a source of current such as ordinary line current. Terminal 162 is connected via conductor 164 to a common terminal 166 of hydraulic valve 74a. Terminal 161 is connected via conductors 168 and 170 to one side of switches 154 and 156, while the other side of switches 154 and 156 are connected via conductors 172 and 174 to terminals 176 and 178 of hydraulic valve 74a. When switch 156 is closed, hydraulic valve 74a is energized by the application of current to terminals 166 and 178 and hydraulic fluid is directed to actuator to move flapped valve 68 from the solid line position, closing chute 62, to the dotted line position 180, to close chute 60 and direct material received by hopper 59 into bin 66. Override switches 179 and 181 are provided to manually override switches 154 and 156.

Figure 6:
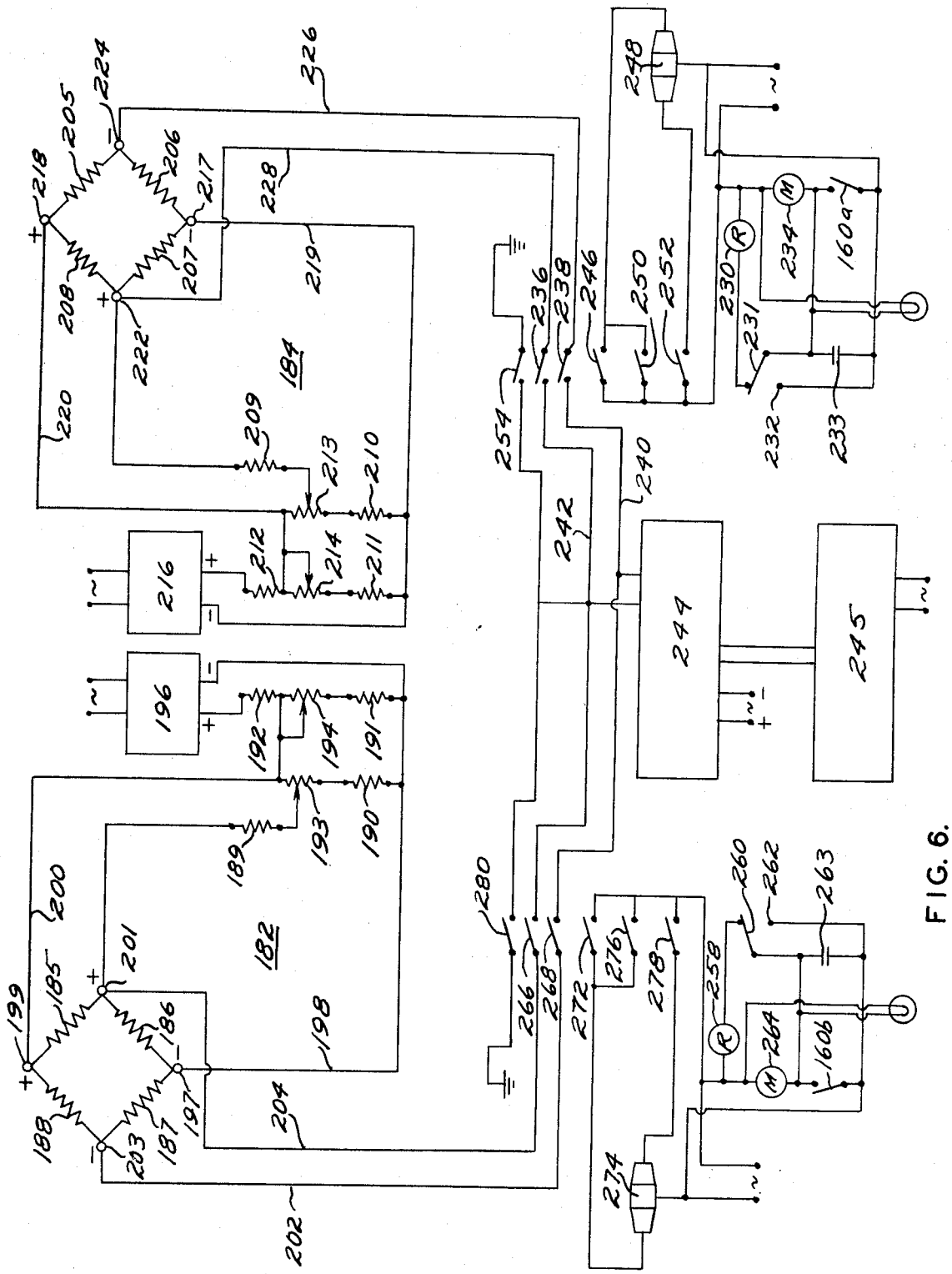

Referring now to FIG. 6, there is shown two load cells 182 and 184. Load cell 182 is made up of resistances 185, 186, 187 and 188 connected in a bridge circuit and balancing resistors 189, 190, 191 and 192 plus a span adjust potentiometer 193 and a zero adjust potentiometer 194. Load cell 182 is connected to a DC power supply 196 at the input terminals thereof comprising the junctions 197 and 199 between resistances 186, 187 and 185, 188 via conductors 198 and 200. The load cell output terminals comprise the junctions 201 and 203 between resistances 185, 186 and 187, 188. The output terminals are connected to readout and recording circuits via conductors 202 and 204. Load cell 184 is made up of resistances 205, 206, 207 and 208 connected in a bridge circuit and balancing resistors 209, 210, 211 and 212 plus a span adjust potentiometer 213 and a zero adjust potentiometer 214. Load cell 184 is connected to a DC power supply 216 at the input terminals thereof comprising the junctions 217 and 218 between resistances 206, 207 and 205, 208 via conductors 219 and 220. The load cell output terminals comprise the junctions 222 and 224 between resistances 207, 208, and 205, 206. The output terminals are connected to readout and recording circuits via conductors 226 and 228.

Figure 4:
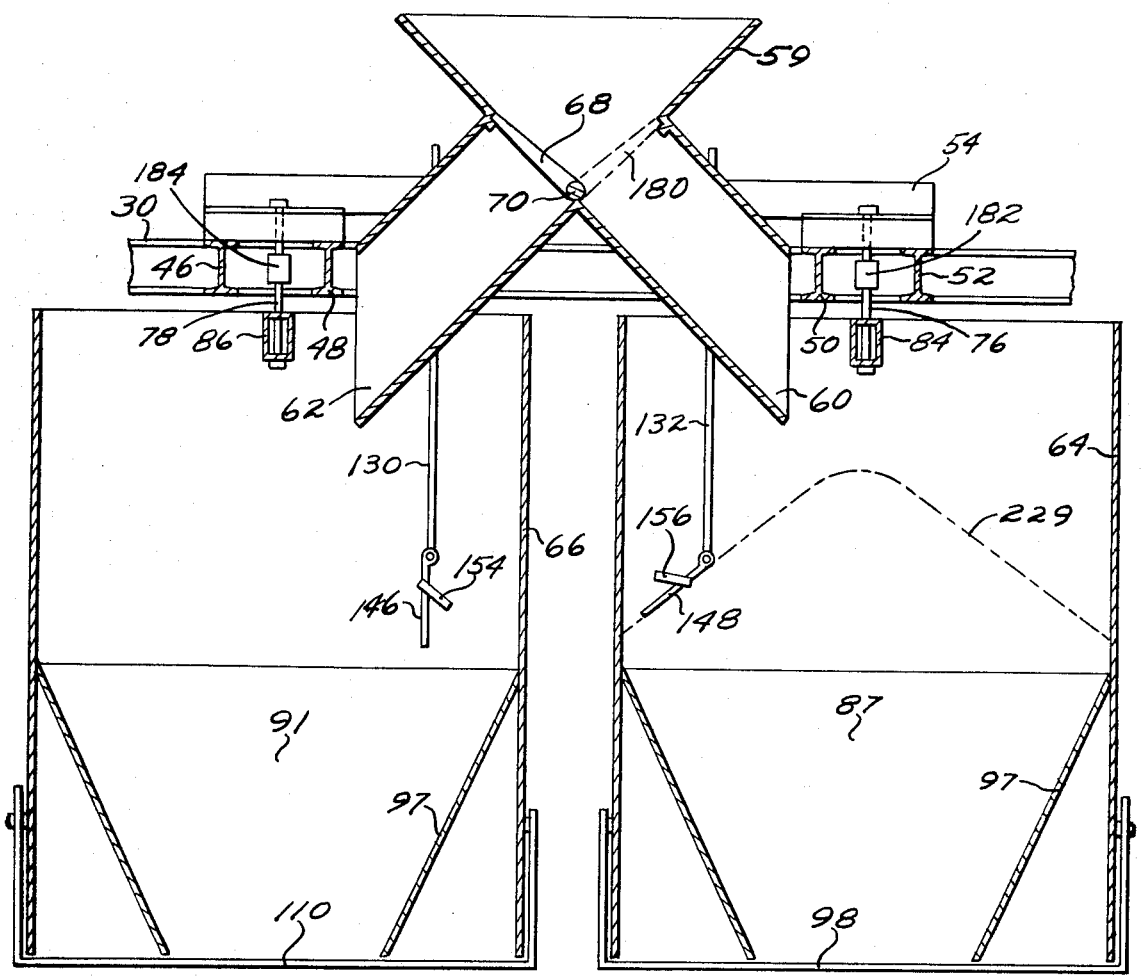
FIG. 4 is a view in cross section of the material receiving containers with portions broken away to conserve space.

Load cell 182 is suspended from plate 82 and in turn suspends bin 66 and load cell 184 is suspended from plate 80 and in turn suspends bin 64. When switch 156 is closed as by a material being received in bin 64 reaching the dotted line 229 level, FIG. 4, the flapper valve 68 is moved to the dotted line 180 position and momentarily closes switch contacts 160a of switch 160. When contacts 160a close, the relay 230 is activated, closing contact 233 which holds in relay through contact 231 and starts timer motor 234. A plurality of cams are connected to the shaft of timer motor to open and close a plurality of switch contacts in timed relation. As soon as timer motor 234 is activated, it closes contact 231 with 232 which drops out relay 230 and keeps the timer motor energized until the end of a weighing cycle. Next in the timed sequence, switches 236 and 238 are closed by timer motor to connect the output of the load cell 184 to the input 240 and 242 of a digital voltmeter 244. The digital voltmeter senses the output of the load cell 184 in terms of the weight of the bin 64 plus the weight of the material being weighed which shall be termed the gross weight which is displayed. On command, the gross weight information is transmitted to the printer 245 where it is printed. Switch 246 is then closed for a period of time sufficient to actuate hydraulic valve 248 to supply hydraulic fluid to actuator 108 and open clam shell doors 98 part way to initiate the flow of material onto the moving conveyor belt 118. After flow is initiated, switch 250 is closed and maintained closed until the clam shell doors are completely open. After the lapse of time sufficient for all material to be discharged, switch 250 is opened and switch 252 is closed to actuate the hydraulic valve 248 to close the clam shell doors. Switch 254 is then closed to ground the printer input so that the next reading will be entered as a negative value. Switch 254 is opened and switches 236 and 238 are closed so that the reading by the voltmeter is printed as a negative tare weight and the net weight of the material discharged is accumulated in the total. This completes the cycle and the material will continue to be received in bin 66 until switch 154 is closed and the cycle is repeated. A pilot light may be connected across motor 234 to show which bin is in the weighing cycle.

The next cycle starts when switch 154 is closed by the material level reaching a predetermined level in bin 66. When switch 154 closes, the flapper valve 68 is moved back to the solid line position closing chute 62 and again directing material received by hopper 59 to bin 64. When flapper 68 is moved to the solid line position, switch 160b is closed momentarily energizing relay 258, closing contacts 263 which start timer motor 264. When timer 264 is activated, armature 260 is closed with contact 262 holding timer activated and dropping out relay 258. A plurality of cams are connected to the shaft of the timer motor to open and close a plurality of switch contacts in timed relation. As soon as the timer motor is actuated a cam keeps contact 262 closed until the end of a weighing cycle. Next in the timed sequence, switches 266 and 268 are closed by timer motor to connect the output of the load cell 182 to the input 240 and 270 of the digital voltmeter 244. The digital voltmeter senses the output of the load cell 182 in terms of the weight of the bin 66 plus the weight of the material being weighed which shall be termed the gross weight which is displayed. On command, the gross weight information is transmitted to the printer 245 where it is printed. Switch 272 is closed for a period of time sufficient to actuate hydraulic valve 274 to supply fluid to the actuator operating clam doors 110 to open same part way to initiate the flow of material from bin 66 onto belt conveyor 118. After flow is started, switch 276 is closed and maintained closed until the clam shell doors are completely open. After the lapse of a time period sufficient for the material to be completely discharged, switch 276 is opened and switch 278 is closed to actuate the hydraulic valve 274 to close the clam shell doors. Switch 280 is then closed to ground the printer input so that the next reading will be entered as a negative value. Switch 280 is opened and switches 266 and 268 are closed so that the reading by the voltmeter is printed as a negative tare weight and the net weight of the material discharged is accumulated in the total. Accumulated sub-totals and totals of net weights are printed by external commands. This completes the cycle and material will continue to be received in bin 64 until switch 156 is closed with a new cycle then beginning.

Thus it is seen that a unique continuous weighing apparatus is provided which is controlled by the receiving of a predetermined volume of material to be weighed to initiate the weighing function. The accuracy of the apparatus is not affected by either weight variations of the material, i.e., specific gravity, or by variations in the belt speed. Thus, changes in the flow rate of the material have no effect upon the weighing function.

While the apparatus has been illustrated with two bins, it is obvious the essence of the invention would equally apply to the use of but one bin or more than two.

What is claimed is:
1. A weighing apparatus comprising a material receiving receptacle, means for selectively delivering a material to be weighed to said receptacle, sensing means for sensing the delivery to said receptacle of a predetermined volume of material, means to terminate the delivery of, material to said receptacle when the predetermined volume of material has been delivered as sensed by the sensing means, weighing means for weighing the material receiving receptacle, and the received material in response to the predetermined volume of material being sensed by the sensing means and means to discharge the weighed material from the receptacle and reinitiate delivery of the material to be weighed to the receptacle.

2. The weighing apparatus according to claim 1 wherein the sensing means is a level sensitive switch adapted to be actuated when the material reaches a predetermined level.

3. The weighing apparatus according to claim 2 wherein the level sensitive switch is responsive to the angle of repose of the material being weighed.

4. A method of weighing free flowing material which comprises the steps of introducing a material into a receptacle, continuing the introduction of material into the receptacle until a predetermined volume of material has been received, sensing the introduction of a predetermined volume and interrupting the delivery of further material to the receptacle in response thereto, weighing the receptacle and received material, discharging the weighed material from the receptacle, and repeating the cycle.

* * * * *